Patented Mar. 19, 1929.

1,705,655

UNITED STATES PATENT OFFICE.

FREDERICK M. BECKET, OF NEW YORK, AND WILLIAM C. READ, OF NIAGARA FALLS, NEW YORK, ASSIGNORS TO ELECTRO METALLURGICAL COMPANY, A CORPORATION OF WEST VIRGINIA.

SMELTING OF TUNGSTEN ORES.

No Drawing.    Application filed March 26, 1928. Serial No. 264,956.

The invention is a process of smelting tungsten ores in which reduction is effected by a self-propagating reaction between the ore and silicon. A principal object of the invention is to provide a process giving a high recovery of tungsten and a low recovery of certain objectionable impurities present in the ore; in other words to produce metal in which the ratio of tungsten to the said impurities is higher than in the ore. Accordingly the invention is especially applicable to ores which are so impure as to be suitable for prior smelting processes only after being subjected to a preliminary purification. Many ores of this class can be smelted by the process described herein without previous purification, producing an acceptable grade of ferrotungsten.

In accordance with the invention the ore participating in the self-propagating reaction with silicon is simultaneously subjected to the action of chlorine compounds or sulphur compounds to convert a substantial proportion of the impurities into volatile substances and expel them from the charge. Impurities which are effectually eliminated in the process are tin, copper, and arsenic. Sodium chloride, calcium chloride and ferric chloride can be used to expel tin and copper, but ammonium chloride and bleaching powder are usualy more effective. Sulphur and sulphur compounds are especially useful for eliminating arsenic. An excellent elimination of the foregoing impurities can be brought about by adding chloride of sulphur to the charge.

In carrying out self-propagating reactions the usual aim is to secure as vigorous and hot a reaction as possible in order that the reduced metal may separate itself completely from the slag and form a regulus. In the case of a metal as difficultly fusible as tungsten, a very high temperature is of course required to produce a regulus or "hearth" of metal.

We have found that when additions such as those which have been mentioned are added to the charge, but little purification occurs if the reduction is rapid and vigorous. We therefore retard the reaction so that it goes on at a lower temperature and we preferably retard it as much as practicable without causing it to lose its self-propagating character and without coming unduly close to a condition which would result in an unsatisfactory recovery of tungsten.

The reaction may be accelerated by grinding the reacting materials very finely, and by mixing them intimately; by the use of a large charge, and by so disposing the charge as to minimize radiation losses; by preheating the charge; by excluding so far as possible materials which do not participate in the reaction, but which absorb heat therefrom; and by the addition of excess silicon together with oxidizing agents to react with it in a collateral strongly exothermic reaction. The reaction may be retarded by appropriately altering or omitting any of the foregoing conditions. It will be apparent that a given retarded reaction rate can be brought about by many different combinations of factors, but the following will illustrate conditions which are suitable in many cases.

The silicon is used in the form of the commercial product, so-called silicon metal, and is finely ground and thoroughly mixed with the finely ground ore. The charge is spread in a relatively thin layer, for example six inches thick, and is not preheated. A few per cent of oxidizing agent or "promoter", such as sodium nitrate or manganese dioxide may be added, or none may be used. The best elimination of impurities occurs when the tungsten is completely reduced but when neither the metallic nor the non-metallic products of reaction are more than incipiently fused.

The reduced metal may in some cases be recovered in merchantable form by mechanically or magnetically separating the reaction products. In other cases it is necessary to melt the reduced metal, either before or after separating it from the non-metallic reaction products. In case such melting is contemplated the self-propagating reduction can be conveniently carried out in an electric furnace and the power then applied to the reaction products.

Among the more obvious of the possible variations of the process is the use of various silicon alloys instead of silicon in the self-propagating reduction.

The following specific examples are illustrative of procedure which may be used.

Example I.

Charge.

| | Lbs. |
|---|---|
| Wolframite | 1724 |
| Silicon metal | 334 |
| Bleaching powder | 170 |
| Iron ore (magnetite) | 100 |
| Sodium nitrate | 18 |
| Lime | 2 |

Analysis of ore.

| %$WO_3$ | %W | %Mn | %Sn | %As | %Fe |
|---|---|---|---|---|---|
| 70.48 | 55.90 | 8.25 | 1.53 | 0.25 | 9.97 |

The reaction required 35 minutes.

Analysis of metal.

| %W | %Mn | %Si | %Sn | %As |
|---|---|---|---|---|
| 82.23 | 0.57 | 0.60 | 0.31 | 0.13 |

Portion of metal solid—balance dirty. Product was mechanically concentrated.

Example II.

Charge.

| | Lbs. |
|---|---|
| Wolframite (same as in Example I) | 1488 |
| Si metal | 290 |
| Bleaching powder | 147 |
| Iron ore (magnetite) | 87 |
| $S_2Cl_2$ | 87 |

Rather slow reaction—40 minutes required for completion.

Analysis of alloy.

| %W | %Mn | %Si | %Sn | %As |
|---|---|---|---|---|
| 82.51 | 0.50 | 0.73 | 0.11 | 0.10 |

Mechanical concentration of all of product required.

Example III.

Ore analysis.

| %W | %Fe | %Mn | %Sn | %As |
|---|---|---|---|---|
| 54.82 | 9.49 | 8.37 | 2.43 | 0.16 |

Charge.

| | Lbs. |
|---|---|
| Wolframite | 270 |
| Silicon metal | 46 |
| $S_2Cl_2$ | 54 |

Alloy analysis.

| %W | %Mn | %Sn | %As |
|---|---|---|---|
| 78.58 | 0.52 | 0.04 | 0.007 |

W recovery in alloy—96%.

After the exothermic reaction was completed, the products were finished off with electric power in the same furnace to effect a better separation of metal and slag.

We claim:

1. Process of smelting impure tungsten ores with simultaneous elimination of impurities which comprises mixing the ore with a substance capable of reacting with an impurity present to produce a readily volatile compound and reducing the ore with silicon in a sluggish self-propagating reaction at a temperature too low to fuse the reaction products completely.

2. Process of smelting impure tungsten ores with simultaneous elimination of impurities which comprises mixing the ore with a chlorine compound and reducing the ore with silicon in a sluggish self-propagating reaction at a temperature too low to fuse the reaction products completely.

3. Process of smelting impure tungsten ores with simultaneous elimination of impurities which comprises mixing the ore with sulphur chloride and reducing the ore with silicon in a sluggish self-propagating reaction at a temperature too low to fuse the reaction products completely.

4. Process of treating tin-bearing tungsten ores which comprises mixing the ore with a chlorine compound, and then heating the mixture by an exothermic reaction between the ore and silicon to a temperature suitable for the formation and volatilization of tin chloride.

In testimony whereof, we affix our signatures.

FREDERICK M. BECKET.
WILLIAM C. READ.